UNITED STATES PATENT OFFICE.

FERDINAND L. SARMIENTO AND WILLIAM G. GRIMM, OF PHILADELPHIA, PENNSYLVANIA, ASSIGNORS OF ONE-FIFTH TO SAMUEL P. SADTLER, OF SAME PLACE.

DISINFECTANT.

SPECIFICATION forming part of Letters Patent No. 339,935, dated April 13, 1886.

Application filed June 13, 1885. Serial No. 168,563. (No specimens.)

*To all whom it may concern:*

Be it known that we, FERDINAND L. SARMIENTO and WILLIAM G. GRIMM, both citizens of the United States, residing in the city and county of Philadelphia, State of Pennsylvania, have invented a new and useful Improvement in Disinfecting Mixtures and Germicides, which improvement is fully set forth in the following specification.

Our invention consists in mixing dry hypochlorites—such as calcium hypochlorite, sometimes called "chloride of lime" or "bleaching-powder," itself a well-known disinfectant—with carbolic acid and its compounds, with the view of producing a new and more energetic disinfecting mixture. We do not mean that such a mixture has simply the individual disinfecting effects of the general ingredients added together; but that there is a chemical reaction between them, which we claim to have discovered and first proposed to apply for disinfecting or germicide and similar purposes, which reaction greatly increases the effect over what they would have singly. This reaction takes place by mixing dry calcium hypochlorite with carbolic acid, its compounds, called "carbolates," and with crude mixtures, like gas-tar, which contain carbolic acid. We do not therefore confine ourselves to any one of these methods exclusively. If a disinfecting mixture is to be made for use on a large scale, where cleanliness in handling is not indispensable, we take crude gas-tar, especially the light fraction known as "light oil" or the fraction known as "dead oil," which contains the tar acids—viz., carbolic and cresylic acids—and mix this with dry calcium hypochlorites or bleaching-powder, when an abundance of chlorine and phenol and tarry vapors is given off which have great disinfecting value; or, if a mixture is designed for domestic use which is more conveniently handled, we take dry carbolate of lime in powder and mix it with dry calcium hypochlorite or bleaching-power. In this latter case we have a mixture of dry powders of little odor, which, without the necessity of adding acids or any liquids whatever, gives off torrents of chlorine, carbolic-acid vapors, and other gases of great disinfecting value.

Among the advantages of these mixtures over the mixtures generally used for the development of chlorine gas for disinfecting purposes may be especially noted that we do not use corrosive or poisonous acids for the decomposition of the hypochlorite or bleaching-powder, but effect it by what may be called a "double decomposition," in the one case of two clean dry powders with each other and in the other of a powder with a thick tar, which, after the reaction is complete, forms a hard and compact mass with the decomposed powder.

The relative proportions which we use are one part of the hypochlorite to one part of the carbolate; but to this we do not limit ourselves.

The ingredients are placed in a box provided with a suitable cover, and when required for use the lid is removed and the vapors escape into the apartment or other place where the box is located.

We are aware that the action of aqueous solutions of hypochlorite of lime and phenol upon each other has been studied, and that the Russian chemist, Dianin, has published (Berichté XIII, p. 2403) the results of such action. He found that on mixing solutions of phenol and chloride of lime a reaction at once set in, and the chief product was trichlorophenol, while mono and dichlorophenol were also formed.

We do not claim the process described by Dianin, nor the use of a mixture of aqueous solutions of phenol and bleaching-powder.

We do not desire to get trichlorophenol or similar products, nor as far as we can distinguish have we ever gotten it in our mixture. We have repeated Dianin's experiments and have satisfied ourselves that when aqueous solutions are used, no matter how concentrated, no free chlorine gas is given off at all. This evolution of chlorine gas we consider to be distinctive of the mixture that we have invented and to be vital for its use as a disinfecting mixture.

We are aware that the direct action of chlorine gas upon phenol has been studied by C. O. Cech, (Chem. Centralblatt, January 5, 1881, p. 8,) and that he prepared trichlorophenol in this way. We do not claim this process;

nor do we wish to form any of the products obtained by him. He takes as the starting-point in his process what is one of the objective points in our process—viz., the production of chlorine gas. This of itself shows that the mixture of Cech and that which we have invented are radically different things.

We are aware that disinfecting mixtures containing coal-tar are known—as, for instance, McDougall's and Süvern's—but the composition of these is different from what we claim to have invented. Thus Süvern's disinfecting mixture (lunge, coal-tar, and ammonia, p. 80) consists of one hundred parts of slaked lime, fifteen parts of coal-tar, and fifteen parts of magnesium chloride. Such a mixture could not possibly evolve chlorine gas, magnesium chloride not being able to give off its chlorine in the free state as bleaching-powder does.

We are aware of British Patent No. 1,337 of 1875. This was to Jean Teychenné, of Birmingham, an upholsterer, and was for improvements in apparatus to be used for disinfecting bedclothes, &c., and announced no new disinfecting substance or mixture of substances. It was solely for a mechanical contrivance, and only incidently spoke of the several well-known disinfectants which were to be used with his apparatus—such as carbolic acid and chlorine—whether evolved from chloride of lime or generated by heating a mixture of hydrochloric acid and peroxide of manganese, and generally such other disinfecting materials as may be generated or volatilized at ordinary or moderately elevated temperatures.

We do not claim the mechanical invention of Teychenné, but a newly-invented mixture of materials which shall have disinfecting value, no matter with what form of apparatus it is applied.

Having thus described our invention, what we claim as new, and desire to secure by Letters Patent, is—

A disinfectant or germicide formed of dry hypochlorites—such as hypochlorite of lime—with carbolic acid, whether free or in combination, as in a carbolate, whether pure or as it exists in crude mixtures, said parts being combined in substantially the proportions stated.

FERDINAND L. SARMIENTO.
WM. G. GRIMM.

Witnesses:
JOHN A. WIEDERSHEIM,
A. P. GRANT.